Nov. 7, 1933.  M. WEBER  1,933,949
FAN WHEEL FOR AUTOMOBILES
Original Filed Jan. 16, 1933  3 Sheets-Sheet 1
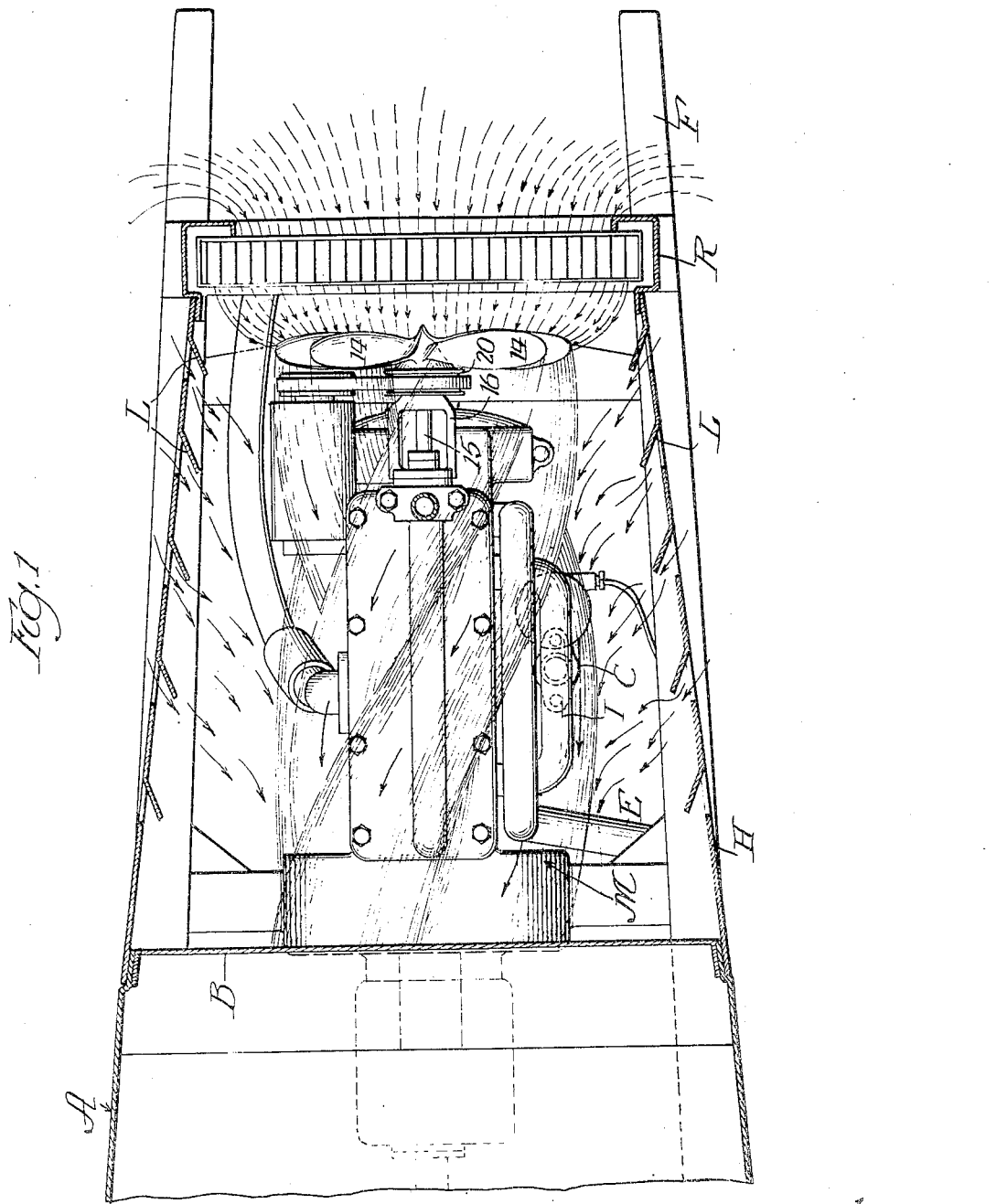

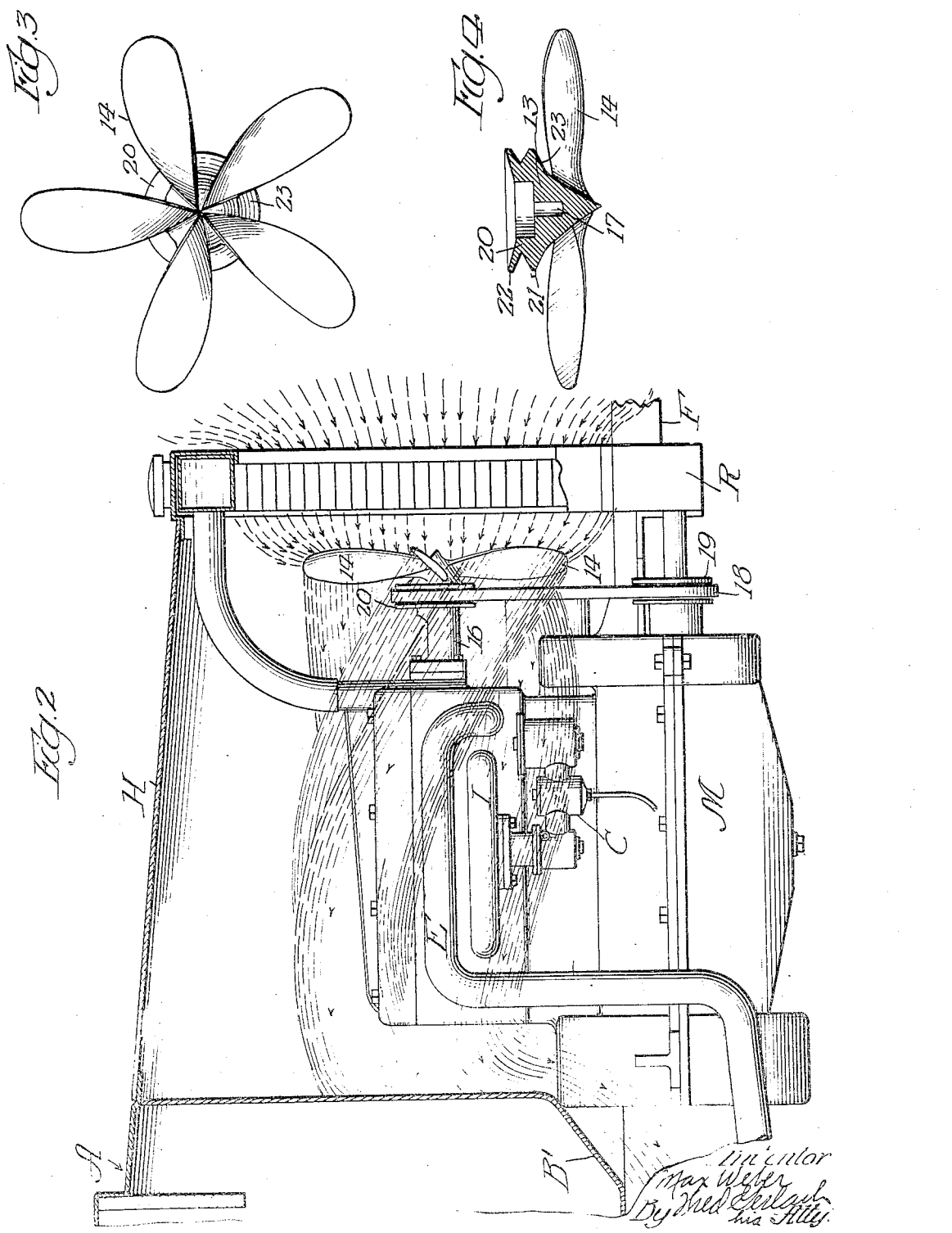

Nov. 7, 1933.    M. WEBER    1,933,949
FAN WHEEL FOR AUTOMOBILES
Original Filed Jan. 16, 1933    3 Sheets-Sheet 3
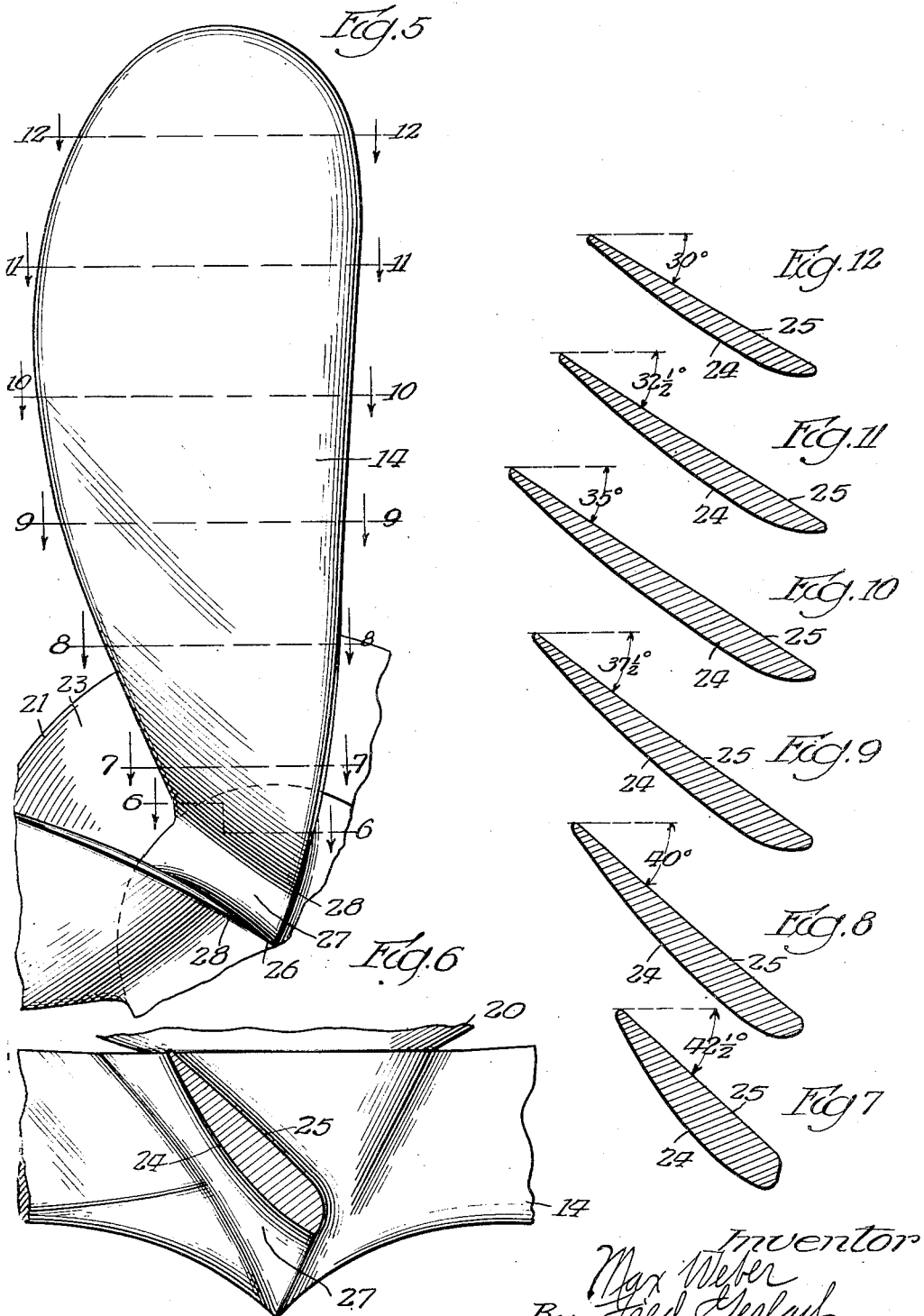

Patented Nov. 7, 1933

1,933,949

UNITED STATES PATENT OFFICE 1,933,949

FAN WHEEL FOR AUTOMOBILES

Max Weber, Chicago, Ill.

Original application January 16, 1933, Serial No. 651,874. Divided and this application April 28, 1933. Serial No. 668,367

5 Claims. (Cl. 123—171)

The present invention relates generally to fan wheels for automobiles. More particularly, the invention relates to that type of automobile fan wheel which is located between the radiator and the motor and operates during drive thereof to draw air through the radiator for water-cooling purposes.

One object of the invention is to provide a fan wheel of this type which is more efficient in operation than, and is generally an improvement upon, previously designed automobile fan wheels by reason of the fact that the blades thereof are so designed and shaped that they operate during drive of the wheel to draw the air through all portions of the radiator substantially uniformly and at a low velocity and to discharge the air rearwardly in high velocity spiral streams around the motor in order to effect maximum cooling of the latter and also to insure a continuous supply of fresh air to the intake of the carburetor and to cool the gasoline line and this eliminate what is known in the automotive industry as "air pockets" in the air intake of the carburetor and "vapor locks" in the gasoline line.

Another object of the invention is to provide an automobile fan wheel of the type under consideration in which the hub tapers to a point at the front side of the wheel so that pressure resistance in front of the hub is eliminated, and the blades are of such length and are so arranged that the streams of air that are produced by the pressure faces thereof and travel spirally around the motor are of such intensity and concentration that they draw fresh air inwardly through the louver openings in the sides of the hood over the motor for motor-cooling purposes and then flow downwardly and rearwardly under the automobile body.

A further object of the invention is to provide a fan wheel of the last mentioned character in which the tapered front part of the hub has curved surfaces which operate during drive of the wheel to produce a suction effect whereby the air directly in front of the hub is drawn into position for contact with the pressure faces of the blades, and also operate to assist rotation of the fan and increase the efficiency of the latter when the automobile with which the fan is used is driven forwardly.

A still further object of the invention is to provide an automobile fan wheel which is generally of new and improved construction, is extremely efficient in operation and requires but a small amount of power to drive it in proportion to the amount of air displacement.

Other objects of the invention and the various advantages and characteristics of the present fan wheel construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals and letters of reference denote corresponding parts throughout the several views:

Figure 1 is a view, partly in plan and partly in elevation, of the motor end of an automobile to which is applied a fan wheel embodying the invention, and illustrates the manner in which the streams of air which are formed by the pressure faces of the blades of the fan wheel during rotation of the latter travel spirally around the motor and draw air inwardly through the louver openings in the sides of the hood for motor-cooling purposes;

Figure 2 is a view, partly in side elevation and partly in vertical section, of the motor end of the automobile of Figure 1 and shows the manner in which the fan wheel operates to insure a continuous supply of fresh air to the intake of the carburetor of the motor and to cool the gasoline line and exhaust pipe;

Figure 3 is a front view of the fan wheel;

Figure 4 is a section on the line 4—4 of Figure 3;

Figure 5 is an enlarged front view of one of the blades of the fan wheel;

Figure 6 is a transverse section taken on the line 6—6 of Figure 5 and illustrating in detail the construction and shape of the hub surfaces which form continuations of the inner end portions of the suction faces of the blades and serve, during drive of the fan, to produce a suction effect whereby the air directly in front of the hub is drawn into position for contact with the pressure faces of the blades;

Figure 7 is a transverse section taken on the line 7—7 of Figure 5 and showing the cross sectional shape and the angularity of the blade at the root portion, that is, at the point where the blade is joined to or united with the hub;

Figure 8 is a transverse section taken on the line 8—8 of Figure 5 and showing the cross sectional shape and the angularity of the blade at approximately one-sixth of the way from the inner end of the blade to the outer end;

Figure 9 is a transverse section taken on the line 9—9 of Figure 5 and showing the cross sectional shape and the angularity of the blade at approximately one-third of the way from the inner end of the blade to the outer end;

Figure 10 is a transverse section taken on the line 10—10 of Figure 5 and showing the cross sectional shape and the angularity of the blade at approximately one-half of the way from the inner end of the blade to the outer end;

Figure 11 is a transverse section taken on the line 11—11 of Figure 5 and showing the cross-sectional shape and the angularity of the blade at approximately two-thirds of the way from the inner end of the blade to the outer end; and Figure 12 is a transverse section taken on the line 12—12 of Figure 5 and showing the cross sectional shape and the angularity of the blade at approximately five-sixths of the way from the inner end of the blade to the outer end.

The fan wheel which forms the subject matter of the invention is adapted for use in connection with an automobile A. It consists of a hub 13 and five blades 14 and is preferably in the nature of a one-piece, aluminum casting, although it may be formed of molded material such as bakelite, or it may be drop forged, stamped or otherwise formed. The automobile A is shown more or less diagrammatically in Figures 1 and 2 of the drawings, and embodies a frame or chassis F upon the front end of which is mounted a motor M. The latter is of the internal combustion type and embodies at one side thereof an intake manifold I, an exhaust manifold E and a carburetor C. A radiator R is mounted on the frame F in front of the motor and is connected to the water jacket of the motor so that the water circulates therethrough for cooling purposes, as well understood in the art. The motor M is enclosed by a hood H, the sides of which embody louvers L and are pivoted so that they may be swung upwardly in order to provide access to the motor. The front end of the hood rests on a flange which extends around and projects rearwardly from the radiator R, and the rear end of the hood rests on a flange which projects forwardly from and is formed as an integral part of the cowl of the body of the automobile. A bulkhead or cross wall B forms a closure for the rear end of the hood and is located directly behind the motor. This bulk-head, together with an inclined floorboard B', forms the front for the driver's compartment of the automobile.

The fan wheel is located directly behind the radiator and operates, as hereinafter described, to draw air through the radiator and force it rearwardly around the motor M. It is carried by a horizontally extending stub shaft 15 and is horizontally aligned with the cylinder forming portion of the motor block. The stub shaft 15 extends longitudinally of the frame of the automobile and is supported rotatably in a bracket 16 which is fixedly secured to the front end of the motor M. The front end of the stub shaft extends into an open-ended, cylindrical socket 17 in the rear end of the hub 13 of the fan wheel and is secured fixedly to the hub for fan wheel driving purposes by means of a pin, key or set screw (not shown). The fan wheel is driven by means of an endless belt 18 which extends around and is driven by a pulley 19 on one of the operating shafts of the motor, such, for example, as the cam shaft, and extends around and serves to drive a pulley 20 at the rear end of the hub of the fan wheel. When the motor M is in operation, the fan wheel is driven through the medium of the belt 18 and the pulleys 19 and 20 and operates to draw air through the radiator R and to force it rearwardly around the motor M for cooling purposes. The pulley 20, as shown particularly in Figure 4 of the drawings, is formed as an integral part of the hub 13 and consists of a pair of annular flanges 21 and 22 which are spaced apart to form a groove for the belt 18. The flange 21 is located in front of the flange 22 and embodies a front face 23 which is conical and is so tapered that it unites with the hub at the central portion thereof. By employing the conical front face 23, the air which is projected rearwardly by the fan wheel is deflected slightly outwardly in order to produce a more efficient cooling of the space behind the radiator R.

The blades 14 of the fan wheel are formed integrally with, and radiate from, the central portion of the hub 13 and are spaced equal distances apart. By virtue of the fact that there are five blades, each blade extends at an angle of 72° with respect to the two adjacent blades. The blades 14 embody suction faces 24 at the front thereof and pressure faces 25 at the back, and are angled with respect to the plane of rotation of the fan wheel so that the suction faces operate during drive of the wheel to draw air rearwardly through the radiator R into contact with the pressure faces 25. The latter in turn effect rearward propulsion of the air around the motor M. The pressure faces are in the form of longitudinally or helically twisted flat surfaces and at the root or inner ends of the blades extend rearwardly at an angle of 42½° with respect to the plane of rotation, as shown in Figure 7. At one-sixth of the distance from the inner ends of the blades to the outer ends, the pressure faces 25 are inclined or angled at 40° with respect to the plane of rotation. At one-third of the distance from the inner ends of the blades to the outer ends, the pressure faces extend rearwardly at an angle of 37½° with respect to the plane of rotation, as shown in Figure 9. Halfway between the inner and outer ends of the blades, the pressure faces extend rearwardly at an angle of 35° with respect to the plane of rotation of the fan wheel. At two-thirds the way from the inner ends of the blades to the outer ends, the pressure faces extend rearwardly at an angle of 32½° from the plane of rotation. At five-sixths of the way from the inner ends of the blades to the outer ends, the pressure faces extend rearwardly at an angle of 30° with respect to the plane of rotation of the fan wheel, as shown in Figure 12. By virtue of the fact that the pitch of the pressure faces of the blades decreases 2½° every sixth of the distance from the inner ends of the blades to the outer ends and the pressure faces at the root or inner end parts of the blades are inclined rearwardly at an angle of 42½° with respect to the plane of rotation, each blade, during rotation of the fan wheel, produces a column or stream of air which flows spirally. By reason of the fact that five blades are employed, the fan wheel produces five distinct helical or spiral columns of air. These five air streams flow around the motor in the manner indicated in Figures 1 and 2 of the drawings and serve to effect cooling of the motor other than by way of the water jacket. As will be noted in Figures 1 and 2, the air streams closely envelop the motor and contact with the motor and form a zone of moving air from one end of the motor to the other. The helical air streams, after enveloping the motor for cooling purposes, strike against the bulk-head or cross wall B and then flow downwardly in response to the action of the inclined floorboards B' and pass rearwardly under the body of the automobile. In view of the specific construction and arrangement of the blades of the fan, the spiral streams of air are propelled rearwardly at high velocity and completely eliminate the formation of dead air spots around the motor. As shown in Figure 2 of the drawings, the carburetor C and the exhaust pipe E are located in the air stream. As a result of this arrangement, a continuous supply of fresh air to the carburetor C is assured and cooling of the products of combustion in the exhaust pipe is effected. By assuring fresh air to the carburetor, air pockets in the carburetor intake are avoided and maximum of efficiency of the motor M is thus obtained. An additional feature of having the carburetor located so that it is in the zone of moving air from the fan wheel is that the gasoline line leading to the carburetor is cooled by the air with the result that vapor locks in the gasoline line are avoided. As indicated in Figures 1 and 2 of the drawings, the five helical streams of air which are formed by the pressure faces of the fan wheel and travel rearwardly around the motor draw fresh air from the outside of the hood through the openings for the louvers L. This fresh air, due to the fact that it is constantly drawn into the space under the hood by the suction created by the five spiral streams of air from the fan wheel, effects cooling of the various motor parts with which it comes in contact. The louvers L are preferably arranged so that they swing inwardly and thus facilitate flow of air into the space under the hood by way of the louver openings.

The leading edges of the blades 14 are substantially straight, as shown in Figures 3 and 5. The extreme outer or tip portions of the blades are rounded and are substantially semi-circular in conformation. The trailing edges of the blades are curved and the central portions of the blades are slightly less than one-half the length of the blades.

The suction faces 24 are convex, as particularly indicated in Figures 7, 8, 9, 10, 11 and 12. The blades are of maximum thickness near the leading edges thereof and the suction faces 24 are sharply curved adjacent the leading edges. The portions of the suction faces adjacent to the trailing edges of the blades are more gradually curved. The shape or conformation of the suction faces 24 is such that during rotation of the fan wheel, the air is drawn into contact with the pressure faces 25 at low resistance. A further attribute or characteristic of the specific shape or conformation of the suction faces of the blades is that form or rotational resistance is reduced to a minimum and there is no noise produced during drive of the fan wheel at high speeds.

In order to destroy pressure resistance in front of the hub of the fan wheel and to increase the efficiency of the wheel, the front end of the hub is formed so that it tapers forwardly to a point or apex part 26 and embodies around the periphery thereof five curved surfaces 27. These surfaces are located between the root or inner end parts of the blades 14 and extend from the apex part 26 to substantially the central portion of the hub. They are concave and slant rearwardly in a direction opposed to that of rotation of the wheel. The front portions of the surfaces 27 are shaped so that they are in the nature of continuations of the leading edges of the blades 14 and extend from the apex part 26 to the leading edges of the blades. The side portions of the surfaces 27 join the suction faces 24 of the blades and are in the nature of continuations thereof. In addition, they operate to produce suction during rotation of the fan and are shaped so that the air which is drawn into contact therewith by suction effect, is directed to the pressure faces 25 of the blades. By shaping the front end of the hub so that it tapers to a point or apex part 26 and embodies the rearwardly extending, curved or arcuate faces 27, pressure resistance in front of the fan wheel is eliminated and the front end of the hub operates, during drive of the fan wheel, to draw the air at the center of the wheel towards the end to project it or direct it into contact with the pressure faces of the blades which, as previously pointed out, force the air rearwardly in helical or spiral streams. The rear portions of the surfaces 27 join the conical front face 23 of the flange 21 in arcuate lines 28, as shown in Figures 3 and 5. The surfaces 27, in addition to increasing the efficiency of the fan wheel, reduce the power necessary to drive the wheel at high speeds in that the air impinging thereagainst has a tendency to rotate the fan. One of the features of shaping the blades so that the pressure and suction faces are of the character described is that the air is drawn through all portions of the radiator uniformly and at a low velocity with the result that efficient cooling of the water in the radiator is effected.

When the motor M of the automobile is in operation and the fan wheel is driven by way of the endless belt 18 and the pulleys 19 and 20, the suction faces 24 of the blades 14 operate to draw air from in front of the radiator R through the radiator and into contact with the pressure faces 25 of the blades. These last mentioned faces, as previously pointed out, deflect the air rearwardly at an increased velocity and in the form of five spiral or helical streams which flow around the motor M. This spiral or helical flow of the air streams around the motor serves to cool the motor and in addition, insures a fresh supply of air to the carburetor C. The five spiral or helical streams of air operate during rearward travel thereof around the motor, to draw fresh air into the space within the hood H through the louver openings in the sides of the hood. This air which is drawn in through the louver openings serves to cool the motor and with the five spiral streams of air passes out of the space within the hood under the inclined floorboard B' and the body of the automobile. The work of the suction faces 24 of the blades 14 of the fan wheel is augmented by the curved, rearwardly slanting surfaces 27 on the front end of the hub. These surfaces, as previously pointed out, produce a suction effect during drive of the fan wheel and direct upwardly into the path of the pressure faces of the blades, the air directly in front of the fan wheel. As a result of the hub formation, there is little, if any, pressure resistance as far as the fan wheel is concerned, and but a minimum amount of power is necessary to drive the fan wheel at high speeds due to the torque produced by the surfaces 27 of the hub in response to impingement of air thereon. By employing five blades instead of four or six or any other number, the fan wheel is harmoniously balanced.

In practice it has been found that a twenty inch fan wheel of the character herein described and shown, when rotated at 800 revolutions per minute, displaces approximately 2130 cubic feet of air per minute and requires an input of approximately 0.066 horse power to drive it at this speed; at 1200 revolutions per minute, the fan displaces approximately 3330 cubic feet of air per minute and requires an input of approximately 0.235 horse power to drive it; at 1600 revolutions per minute, the fan displaces approximately 4640 cubic feet of air per minute and requires an input of approximately 0.563 horse power to drive it; at 2000 revolutions per minute, the fan displaces approximately 6480 cubic feet of air per minute and requires an input of approximately 1.186 horse power to drive it. At a speed of 800 revolutions per minute, a twenty inch, five bladed fan of the character herein specified drives the air at approximately 12.15 miles per hour; at 1200 revolutions per minute, it drives the air at approximately 21.70 miles per hour; at 1600 revolutions per minute, it drives the air at approximately 26.40 miles per hour; and at 2000 revolutions per minute, it drives the air at a velocity of approximately 36.90 miles per hour. These results are directly attributable to the fact that the blades are five in number and are constructed to reduce to a minimum form and friction resistance, and that the front end of the hub substantially eliminates pressure resistance and is shaped to augment the work of the blades by virtue of the fact that it includes the curved surfaces 27.

The herein described fan wheel is exceedingly efficient in operation due to the fact that it operates not only to draw air through the radiator for water cooling purposes, but also to form high velocity streams of air which flow helically around the motor and serve to cool the latter. The wheel may be manufactured at a low and reasonable cost and because of its construction, requires but a minimum amount of power to drive it in proportion to the amount of air displacement.

The invention is not to be understood as restricted to the details set forth, since these may be modified within the scope of the appended claims, without departing from the spirit and scope of the invention.

The present application is in the nature of a division of an application for Letters Patent for improvements in Suction fan wheels filed by me January 16, 1933, Serial No. 651,874.

Having thus described the invention, what I claim as new and desire to secure by Letters Patent, is:

1. In combination with an automobile embodying a chassis with an internal combustion motor mounted in the front thereof, a radiator mounted on the chassis in front of the motor and connected to the water jacket of the latter and a hood over the motor and with louvers at the sides thereof, fan means between the radiator and the motor connected to be driven by the motor and arranged and constructed so that during drive thereof it operates to draw air through the radiator into the space under the hood and to project it in streams which travel rearwardly around the motor for motor-cooling purposes and operate to draw additional air into the aforesaid space through the louver openings in the hood-sides.

2. In combination with an automobile embodying a chassis with an internal combustion motor mounted in the front thereof, a radiator mounted on the chassis in front of the motor and connected to the water jacket of the latter and a hood over the motor and with louvers at the sides thereof, fan means between the radiator and the motor connected to be driven by the motor and arranged and constructed so that during drive thereof it operates to draw air at low velocity through substantially all portions of the radiator into the space under the hood and to project it rearwardly in high velocity streams which flow rearwardly and helically around the motor for motor-cooling purposes and operate to draw additional air into said space via the louver openings in the hood-sides.

3. In combination with an automobile embodying a chassis having mounted at the front end thereof an internal combustion motor with a carburetor at one side of the motor, a radiator mounted on the chassis in front of the motor and connected to the water jacket of the latter and a hood over the motor with side openings therein, a fan wheel between the radiator and the motor connected to be driven by the motor and embodying a plurality of angularly disposed blades shaped and arranged so that during drive of the wheel they operate to draw air at low velocity through the radiator into the space under the hood and to project it rearwardly in high velocity streams which flow helically around the motor and completely envelope the front, sides and back of the motor and contact with the latter from one end to the other for motor cooling purposes, deliver air directly into the air inlet of the carburetor and operate to draw additional air into the space under the hood via the side openings in the hood.

4. In combination with an automobile embodying a chassis having an internal combustion motor mounted at the front end thereof and a radiator mounted in front of the motor, a fan wheel between the radiator and motor connected to be driven by the motor and comprising a hub having concave surfaces at the front end thereof whereby the air striking thereagainst during forward movement of the automobile tends to rotate the wheel, and a plurality of angularly disposed blades connected to and radiating from the central portion of the hub and arranged so that during rotation of the wheel they serve to draw air through the radiator and project it rearwardly about the motor, and a pulley with a belt drive from the motor connected to and forming a part of the rear end of the hub and having a forwardly tapered front face for deflecting slightly outwardly the air projected rearwardly by the blades.

5. In combination with an automobile embodying a chassis having an internal combustion motor mounted on the front end thereof and a radiator mounted in front of the motor, a fan wheel connected to be driven by the motor and comprising a hub, a fan wheel between the radiator and motor connected to be driven by the motor and comprising a hub having a tapered front and with surfaces whereby the air striking thereagainst during forward movement of the automobile tends to rotate the wheel, and a plurality of blades projecting radially from the central portion of the hub and arranged so that during drive of the wheel they serve to draw air through the radiator and project it rearwardly about the motor.

MAX WEBER.